Patented Nov. 29, 1938

2,138,347

UNITED STATES PATENT OFFICE 2,138,347

PURIFICATION OF CAUSTIC

Raymond M. Law and Harry C. Britton, Syracuse, N. Y., assignors to The Solvay Process Company, New York, N. Y., a corporation of New York No Drawing. Application March 19, 1934, Serial No. 716,431. Renewed June 12, 1937

9 Claims. (Cl. 23—184)

This invention relates to the purification of caustic solutions and is especially directed to a method for reducing the sulfate content of such solutions.

In the manufacture of caustics such as sodium hydroxide, the product frequently is contaminated with impurities such as sulfates, etc., contained in the raw materials or formed in the process. Thus, although sodium sulfate is relatively insoluble in caustic solution, it appears to exist in the solution in a state of supersaturation or in an extremely finely divided condition so that filtration does not give a maximum removal of the sulfate and settling is exceedingly slow. Hence, for satisfactory purification a long settling period is required.

In view of the high viscosity and density of concentrated caustic solution (such as an aqueous solution containing more than about 40% NaOH), which render optimum settling even more difficult, the above characteristics are especially undesirable in connection with such a solution.

It has long been known that the content of sodium sulfate in aqueous caustic solution may be reduced by addition of sodium carbonate in solid form. Such a process is disclosed, for example, in an article by Alfons Krause Roczniki Chemji 5, (1925) pages 395 to 402. Although such a process assists in the removal of impurities, it does not give in commercial operation as complete elimination of sodium sulfate as is sometimes desirable.

In accordance with the present invention, it has been found that when an alkali-metal carbonate is formed in situ, that is, its crystallization or precipitation is caused to take place in an alkali-metal hydroxide solution, the solid so formed possesses a physical structure that assists in the removal of sulfate and other finely dispersed or suspended impurities so that a more effective elimination of such impurities is obtainable than is the case using the solid carbonate.

The precipitate not only appears to bring down readily suspended impurities, but possesses a highly beneficial effect upon filtration. In carrying out the filtration of sodium hydroxide solution to remove sodium sulfate and iron compounds for example, the impurities are normally present in such a finely divided form that they pass through the filter diaphragm. The sodium carbonate precipitate formed in accordance with the present invention serves as a filter-aid and prevents the passage of such finely dispersed materials through the interstices of the filter diaphragm and at the same time is of such a character that it does not clog the diaphragm or prevent the easy flow of liquid therethrough.

In order to obtain crystallization of the sodium carbonate in the sodium hydroxide solution, a water-soluble carbonate e. g., an alkali carbonate may be added to the sodium hydroxide as an aqueous solution whereupon sodium carbonate will crystallize out.

A satisfactory solution for treating or mixing with the sodium hydroxide solution may be prepared containing either carbonate or bicarbonate or both; for example, a solution containing 290 grams of sodium carbonate and 80 grams of sodium bicarbonate per liter has been found to be very satisfactory. The solid material formed in situ upon addition of a solution of sodium carbonate or sodium bicarbonate to sodium hydroxide liquors differs from the material resulting from the addition of solid sodium carbonate or sodium bicarbonate since the former material has a physical form that renders it an efficient filter-aid whereas the latter material has a form that tends to block the pores of the filter cloth rather than to assist the filtration.

It is not necessary that a large quantity of the carbonate be added to obtain satisfactory separation but the results obtained appear to depend somewhat upon the ratio of carbonate to sulfate. Thus, if sufficient sodium carbonate is added to raise the ratio of $Na_2CO_3:Na_2SO_4$ in a concentrated NaOH solution to about 1.4:1, and especially 1.5:1 or above, NaOH solutions containing considerably less than .1% $Na_2SO_4$ may be obtained.

In its preferred embodiment the process of this invention involves the addition of sufficient carbonate solution at an elevated temperature to form a precipitate and subsequent cooling of the hydroxide solution to reduce the solubility of the carbonate and effect further precipitation of carbonate on the already formed carbonate precipitate. In this manner a precipitate is formed that is especially effective as a filter-aid and causes a very effective removal of sulfate impurities.

As illustrative of the method that we prefer to employ for carrying out the purification of caustic solutions, the following examples are given:—

*Example 1.*—880 parts of a 48% aqueous solution of sodium hydroxide at about 60° C. and containing about 0.10% of sodium sulfate was vigorously agitated with 1 part of sodium carbonate, added thereto as a 28% aqueous solution, for about twelve hours, during which the solution cooled to about 25° C. The solution was then filtered through fine mesh wire filter cloth to separate the flocculent precipitate so formed. The filtrate contained only about 0.04% of sodium sulfate.

Example 2.—100 parts of an aqueous 48% sodium hydroxide solution containing about .12% of sodium sulfate was agitated at about 60° C. with about 0.5 part of a sodium carbonate solution (containing 290 grams of sodium carbonate and 80 grams of sodium bicarbonate per liter of solution) and was cooled as in Example 1 to between 20° and 30° C. The sodium hydroxide solution was then filtered to separate solids. The filtrate contained about 0.04% of sodium sulfate.

Example 3.—Another sample of the same NaOH solution after being subjected to agitation and filtration in a manner similar to that of Example 2 but without addition of $NaHCO_3$ or $Na_2CO_3$ contained 0.09% of $Na_2SO_4$.

Solutions prepared in accordance with this invention contain not only a reduced sulfate content but a reduced content of carbonates, lime, and iron, since the flocculent character of the precipitate produced (apparently due to the peculiar branching structure of the crystals) appears to be highly conducive to the removal of the fine dispersion or suspension of these materials and makes possible their effective removal by means of filtration. Thus with relatively simple equipment, an aqueous sodium hydroxide solution containing 40% or more NaOH may be prepared which at temperatures above 25° C. is water clear and contains only minimal quantities of impurities. The invention finds special application in the purification of commercial concentrated caustic solutions that are liquid at ordinary temperature more particularly those containing from around 46% to 52% NaOH.

We claim:

1. The method of separating sodium sulfate from an aqueous sodium hydroxide solution containing sodium sulfate, which comprises adding thereto an aqueous solution of a sodium carbonate in sufficient amount to form in situ a carbonate precipitate, and filtering the sodium hydroxide solution to separate the precipitate from the solution.

2. The method of purifying an aqueous sodium hydroxide solution, which comprises adding thereto an aqueous solution of sodium carbonate in sufficient amount to form in situ a carbonate precipitate, and filtering the sodium hydroxide solution to separate the precipitate.

3. The method of purifying an aqueous sodium hydroxide solution, which comprises mixing therewith at an elevated temperature an aqueous solution of a sodium carbonate in sufficient amount to form a carbonate precipitate at said temperature, cooling the solution, and filtering the solution to separate therefrom the precipitate.

4. The method of purifying an aqueous sodium hydroxide solution, which comprises mixing therewith at a temperature of about 60° C. an aqueous solution of a sodium carbonate in sufficient amount to form a carbonate precipitate at said temperature, cooling the solution, and filtering the solution to separate therefrom the resultant precipitate.

5. The method of separating sodium sulfate from a concentrated aqueous solution of sodium hydroxide, which comprises mixing with the sodium hydroxide solution a sodium carbonate solution sufficient to form in situ a carbonate precipitate the quantity of carbonate solution being sufficient to produce a weight ratio of sodium carbonate to sodium sulfate in the hydroxide solution greater than about 1.5:1, and filtering the solution to separate therefrom the precipitate.

6. The method of separating sodium sulfate from a 46% to 52% aqueous solution of sodium hydroxide, which comprises mixing with the sodium hydroxide solution at an elevated temperature a quantity of sodium carbonate solution sufficient to form a carbonate precipitate in the sodium hydroxide solution and also sufficient to produce a weight ratio of sodium carbonate to sodium sulfate in the sodium hydroxide solution greater than about 1.5:1, cooling the solution, and then filtering it to separate therefrom the resultant precipitate.

7. The method of separating sodium sulfate from a 46% to 52% aqueous solution of sodium hydroxide, which comprises mixing with the sodium hydroxide solution at a temperature of about 60° C. a quantity of aqueous sodium carbonate solution sufficient to form a carbonate precipitate in the sodium hydroxide solution and also sufficient to produce a weight ratio of sodium carbonate to sodium sulfate in the solution greater than about 1.5:1, cooling the sodium hydroxide solution to between 20° to 30° C., and then filtering the solution to separate therefrom the resultant precipitate.

8. The method of purifying an aqueous concentrated sodium hydroxide solution, which comprises mixing therewith at an elevated temperature an aqueous alkali carbonate solution in sufficient amount and concentration to form a sodium carbonate precipitate at said temperature, cooling the solution, and filtering the cooled solution to separate the precipitate therefrom.

9. The method of purifying an aqueous concentrated sodium hydroxide solution, which comprises mixing with the solution to be purified at an elevated temperature, a sodium carbonate suspension obtained by addition of an aqueous alkali carbonate solution to an aqueous concentrated sodium hydroxide solution at an elevated temperature, cooling the mixture, and filtering the cooled mixture to separate the precipitate from the sodium hydroxide solution.

RAYMOND M. LAW.
HARRY C. BRITTON.